United States Patent [19]

Allwein

[11] Patent Number: 4,848,539
[45] Date of Patent: Jul. 18, 1989

[54] METHOD AND CONVEYOR FOR TRANSPORTING ARTICLES

[75] Inventor: Robert J. Allwein, Littleton, Colo.

[73] Assignee: Manville Corporation, Denver, Colo.

[21] Appl. No.: 233,397

[22] Filed: Aug. 18, 1988

[51] Int. Cl.$^4$ ............................................. B65G 15/28
[52] U.S. Cl. ..................................... 198/804; 198/841
[58] Field of Search ........................ 198/804, 841, 750

[56] References Cited

U.S. PATENT DOCUMENTS 3,795,304  3/1974  Poundstone .......................... 198/750

FOREIGN PATENT DOCUMENTS 0941257  7/1982  U.S.S.R. ................................ 198/750

Primary Examiner—Robert J. Spar
Assistant Examiner—Lyle K. Kimms
Attorney, Agent, or Firm—John D. Lister; Cornelius P. Quinn; Gregory A. Evearitt

[57] ABSTRACT

A conveyor for transporting articles over a floor. The conveyor is a continuous belt the bottom run of which slides either on the floor or on a slider pad supported on the floor. The upper run supports the articles and slides on the lower run. The conveyor is run at slow speeds and can extend over long distances. It is well suited for moving large relatively lightweight articles such as bulky packages of insulation. Multiple lengths of conveyors can be used in series to move articles relatively great distances.

18 Claims, 2 Drawing Sheets

METHOD AND CONVEYOR FOR TRANSPORTING ARTICLES

FIELD OF THE INVENTION

This invention relates to conveyors. More particularly, it relates to a conveyor for transporting articles substantially at floor level at a relatively slow speed over relatively long distances.

BACKGROUND OF THE INVENTION

Articles manufactured on continuously operating production lines typically are moved from the end of the line to another location remote from the line for further handling. In large manufacturing facilities made up of spaced production lines transportation of the finished products to a warehouse or staging center can be a problem, especially if the product is large and is produced at a rapid rate.

Bulky packages of fiber glass insulation are examples of articles which are difficult to transport from one location to another within a manufacturing facility without creating problems. Because the packages come from the bagger at too fast a rate to allow them to be stacked and moved by a fork lift truck, and because a number of bagging machines are commonly operating at the same time, conveyors have been used to move them to remote locations. Various types of conveyors are available for use. None, however, is ideally suited for the purpose.

Overhead conveyors are commonly used where a clear path to the process equipment is required. They are, however, expensive to support and difficult to service, requiring catwalks and stairs for access. In addition, the equipment required to load overhead conveyors can be prohibitively expensive. Moreover, if material being transported on the conveyor is backed up or blocked, it can fall, thus creating a safety hazard. Also, their height prevents operators from being able to observe products being conveyed along the full length of the conveyors.

Conveyors located under the floor solve many of the problems created by overhead conveyors but create other problems of their own. They are typically very costly and in many cases are not practical to install because of ground water or unstable soil conditions or because it would disturb existing under-floor services. Movement by fork-lift trucks across the trenches resulting from the installation of under-floor conveyors, particularly if the trenches are wide, may require extensive structural bridging. Further, maintenance and housekeeping are difficult in the pits required by under-floor conveyors. Although such conveyors eliminate the need to lift product up to an overhead conveyor, it can be quite costly to lower product onto an under-floor conveyor and to elevate it back up to floor level. In addition, operators also have problems in observing the product being conveyed, and back-up or blockage of product is difficult to clear.

As an alternative to overhead and under-floor conveyors above-floor conveyors are often used. These are typically mounted from 16 inches to 60 inches off the floor, which makes loading and unloading relatively easy depending on the height of the process equipment. Such conveyors are convenient to service and they allow observation of the product being conveyed. Product jams are easy to clear and are not often hazardous. They still, however, restrict access by personnel and fork-lift trucks to and from the process equipment. Installations of above-floor conveyors typically tend to create barriers around the process equipment, allowing no access without bridging over the conveyors.

Still another type of conveyor is the floor conveyor, which is nominally flush with the floor and can thus transport material level with the floor. Examples are people-moving conveyors and conveyors used to handle baggage at airports. Typically, these conveyors are either very complicated devices which include metal decking, wheels and tracks, or are conventional slider bed conveyors which have been sunk into the floor so that the surface of the conveyor is flush with the floor. In either case the floor must be excavated for the full length of the conveyor. They are thus expensive to install and service and cannot be relocated without great additional expense.

It would obviously be desirable to be able to convey articles over relatively long distances in a manner which does not have the drawbacks of the prior art conveyors and which can be installed at an economical cost.

SUMMARY OF THE INVENTION

This invention provides for a conveyor comprising an endless belt the lower return run of which is adjacent to and supported by floor support means and the upper delivery run of which is adjacent to and supported by the lower return run. Because the conveyor is supported by the floor there is no need for expensive support equipment. If there is a need for workers to move from one side of it to the other, they can, with proper safety precautions, walk on it or drive fork lift trucks across it. This is possible because the conveyor extends up above the floor for only a very short distance, preferably not more than ½ inch. The belt has a long life and can be used in long runs of up to about 200 feet. Because the conveyor moves relatively slow, no faster than about 250 feet per minute, its belt life is prolonged and potential safety problems are eliminated.

If desired, a slider pad can be provided between the conveyor belt and the floor to reduce friction. If articles are required to be transported over distances greater than the length of a conveyor, conveyors can be installed in series to allow the articles to be transferred from one conveyor to the next.

Other features and aspects of the invention, as well as other benefits of the invention, will readily be ascertained from the more detailed description of the invention which follows.

DESCRIPTION OF THE PREFERRED EMBODIMENTS

Figure 1:
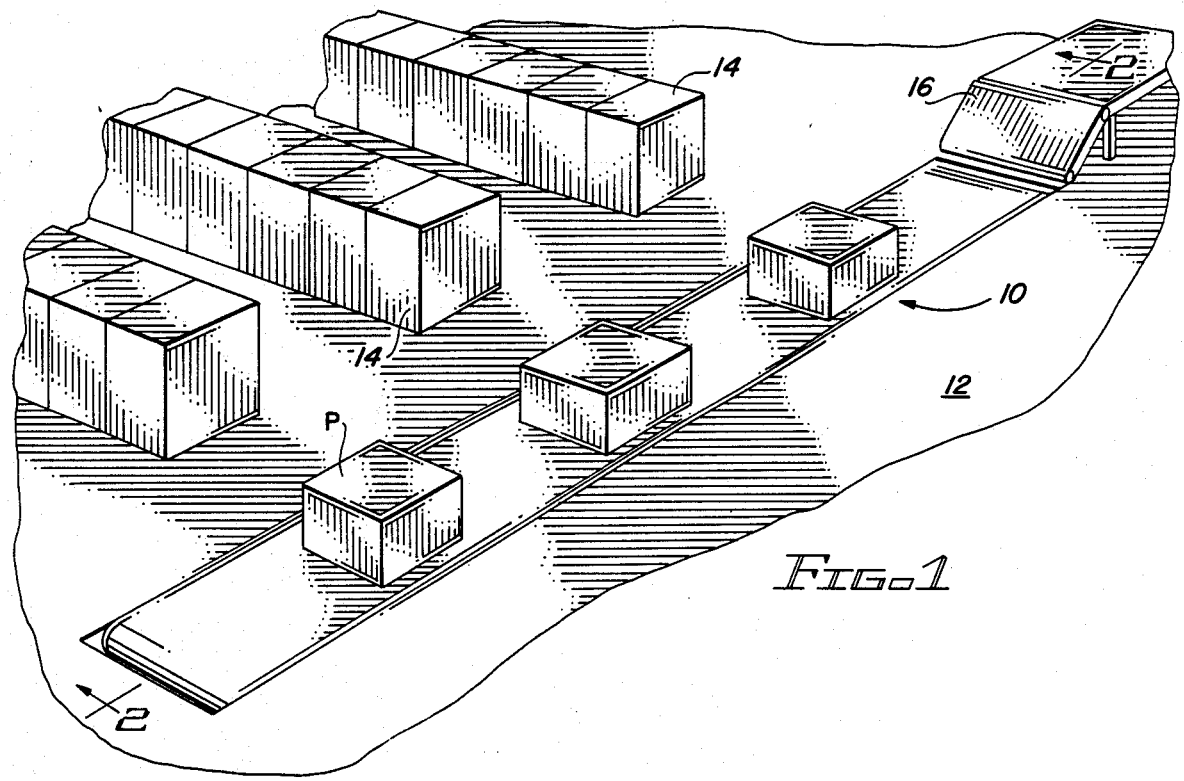
FIG. 1 is a pictorial view of a typical installation of the conveyor of the present invention.

Referring to FIG. 1, the conveyor 10 of the present invention is shown installed on the floor 12 of a manufacturing facility. Reference numeral 14 indicates a schematic illustration of either the downstream ends of spaced manufacturing lines or items which have been produced and are waiting to be moved to another part of the facility. In either case, the conveyor 10 is shown transporting products P to a take-off conveyor 16 where the products can be removed by hand or delivered by the take-off conveyor to other conveying means, not shown.

Figure 2:
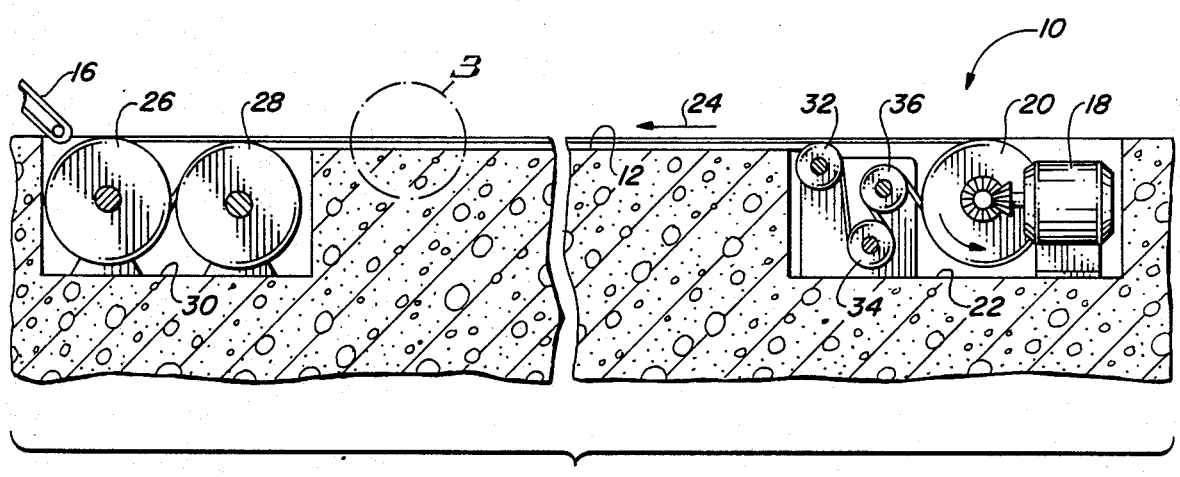
FIG. 2 is a schematic partial transverse sectional view of the conveyor taken on line 2—2 of FIG. 1.

As shown in FIG. 2, a suitable motor and drive arrangement 18 rotates the drive roll 20 about which the conveyor belt 10 is trained. The motor and drive roll are located in a shallow pit 22 extending down from the floor surface 12. The belt 10 moves in the direction of arrow 24 around tail roll 26, over guide roll 28, and back toward the drive roll 20. The tail roll 26 and guide roll 28 are also located in a shallow pit 30. Prior to reaching the drive roll 20 the belt moves over guide roll 32 and around take-up rolls 34 and 36. It will be understood that the mechanical details for mounting the rolls, the connection between the drive roll and the motor, and the means for adjusting the positions of the take-up rolls are not shown since these features are well known in the art and since any suitable design of such features may be utilized. It will also be understood that roll arrangements other than that shown may be employed as long as they permit the conveyor to operate closely adjacent to the floor surface.

A cover preferably is provided over the pit 22 to protect the motor and drive roll mechanism and for safety purposes. A similar cover is not necessary for the pit 30 because the guide roll 288 and tail roll 26 are substantially the entire opening. The take-off conveyor 16 is shown in dotted lines in FIG. 2 to indicate that it may be provided if such a function is desired. Of course the articles may be removed from the conveyor 10 by hand if desired, in which case a take-off conveyor would not be used. Portable take-off conveyors of various types and designs are available, any of which may be employed.

Figure 3:
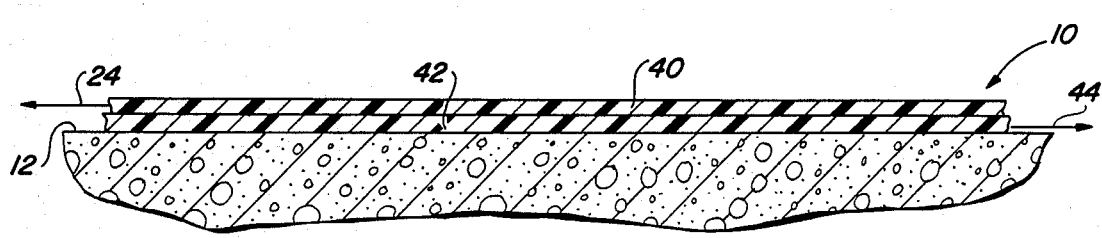
FIG. 3 is an enlarged partial transverse sectional view of the conveyor, showing the area defined by the dotted circle in FIG. 2.

As shown in FIG. 3, the upper delivery run 40 of the conveyor 10 is supported by the lower return run 42 of the conveyor, and the lower return run is supported on the floor 12. Thus the upper run 40 of the conveyor 10, which is moving in the direction of the arrow 24, slides along the lower run 42 of the conveyor, which is moving in the direction of the arrow 44. The lower run 42 in turn slides along the surface of the floor 12. The floor may be comprised of any typical flooring material, such as concrete, while the conveyor belt may be comprised of any suitable material of adequate tensile strength and tear strength which has a coefficient of friction low enough to permit easy relative sliding movement of the two oppositely movig conveyor belt runs and easy sliding movement of the lower run of the conveyor over the floor.

In practice, belts with polyester warp and weft threads coated with polyurethane were found to perform well. An example of such belts are those sold under the name "Transilon" E12/2, which have exhibited good tensile strength and a low coefficient of friction. Obviously, the thinner the belt the less it will extend above the floor. Although the thickness may vary depending upon the requirements of a particular conveyor, it is preferred that it be of a size which provides for adequate strength and flexibility and which maintains the upper surface of the upper run of the conveyor at a maximum height above the floor of about ½ inch. The conveyor thus does not extend above the floor enough to be hazardous to workmen, but allows workmen to easily move finished product from the manufacturing line to the conveyor without having to lift the product more than a minimal amount.

It is important that the rolls support the conveyor at substantially the same height that it is desired for the belt to extend above the floor. If the rolls were to elevate the belt significantly higher than this the belt would assume a concave shape intermediate its length, and would not perform properly. The upper run of the conveyor would not then be supported throughout its length, which would further limit the weight of articles to be moved by the conveyor and would shorten the life of the conveyor belt.

The speed at which the conveyor moves will vary according to requirements. If access to the moving belt is not permitted during operation, speeds up to 250 feet per minute are attainable. If it is necessary to permit foot traffic across the moving belt the speed should be slow enough, perhaps in the order of 50 feet per minute, so as not to be hazardous to personnel. Obviously, the decision as to what speeds are hazardous to personnel crossing a moving belt will vary from one installation to another and will have to be determined in accordance with the policies of the plant. In general, a slow speed prolongs belt life by reducing frictional wear as the upper and lower runs side over each other and as the lower run slides over the floor.

The length of the conveyor can also be a factor in belt wear and the ability of the belt to withstand the stress of sliding movement under load. In general, the stronger the belt and the lower its coefficient of friction, the longer the length the conveyor can be. In order to maintain a practical compromise between economical conveyor belt material of satisfactory strength and length of run, a length no longer than about 200 feet is preferred for loads weighing 10 to 20 pounds per lineal foot. No hard and fast rule can be set for the length, however, since the best length is also a function of the weight and loading density of the articles being moved on the conveyor.

Although not shown, the drive motor 18 can be caused to cut out when encountering excessive tension in the belt. For example, a simple readily available amperage control device can be used to turn off the motor when excessive tension in the belt causes the motor to work too hard. Such a situation could be brought about, for example, by driving a fork lift truck over the conveyor belt while the belt is still running. The weight of the truck would immediately stop the conveyor and the belt would readily withstand the load of the fork lift truck since the belt is supported across its width by the floor. Obviously, other control means could also be used to turn off the drive motor when subjected to too great a load.

Figure 4:
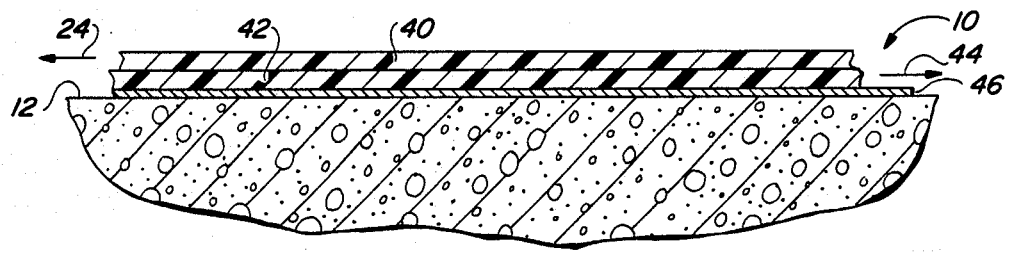
FIG. 4 is a view similar to that of FIG. 3, but showing a modified arrangement.

The belt arrangement described above may be modified if it is desired to improve the sliding action of the lower run of the belt against the floor. As shown in FIG. 4, a slider pad 46 has been placed on the floor between the floor 12 and the lower run 42 of the conveyor belt. The slider pad may be comprised of any suitable material having a relatively low coefficient of friction and the ability to withstand compressive loads. Sheet metal having a thickness of 3/16 inch has been effectively used for this purpose.

Figure 5:
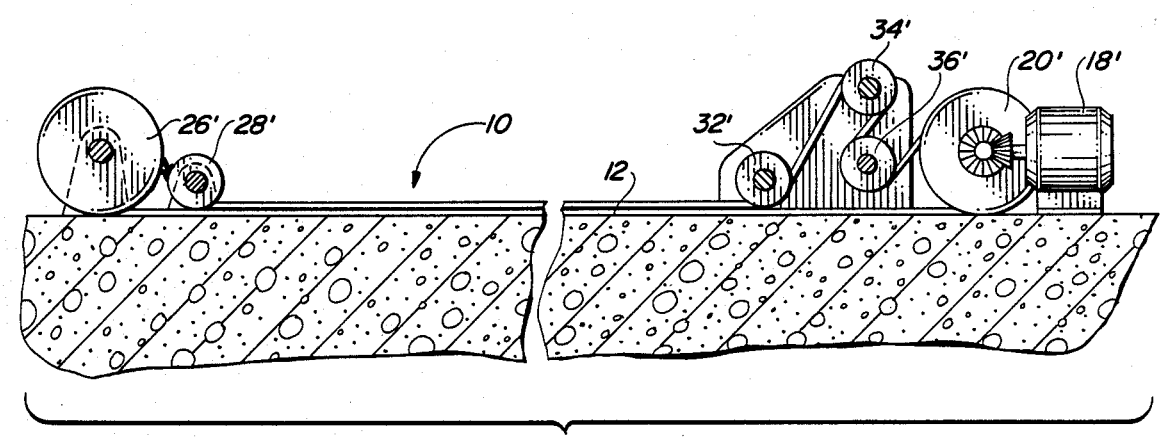
FIG. 5 is a view similar to that of FIG. 2, but showing a modified arrangement.

Referring to FIG. 5, a modified arrangement is illustrated wherein the components for driving and guiding the conveyor belt 10 are located above the surface of the floor instead of in a pit or cavity beneath the floor surface. Thus motor 18', drive roll 20', take-up rolls 34' and 36', and guide roll 32' are located above the floor surface at the right side of the drawing while guide roll 128' and tail roll 26' are located above the floor surface at the left of the drawing. The support structure for holding the rolls and related equipment in their elevated positions has not been shown since it involves details well known to a skilled mechanic. Although not shown, it may be desirable to provide covers for the rolls and drive motor for safety purposes and to reduce the potential of damage to the machinery. In this arrangement the spacing between the conveyor belt and the floor can be the same as in the first embodiment. Similarly, if desired, a separate slider pad could also be incorporated in this arrangement.

Figure 6:
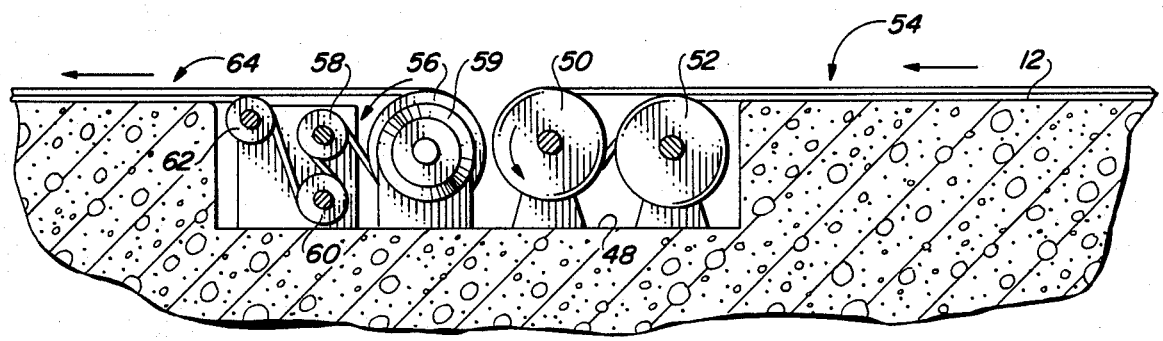
FIG. 6 is a partial transverse sectional view of a further modified conveyor arrangement showing the tail end of one conveyor adjacent the head end of another conveyor.

Referring now to FIG. 6, a pit 48 in the floor 12 houses the tail roll 50 and associated guide roll 52 for the downstream end of conveyor 54, as well as the drive roll 56, take-up rolls 58 and 60, and guide roll 62 for the upstream end of conveyor 64. The drive motor for the drive roll 56 is not shown for the sake of clarity, but it is to be understood that a drive motor would be provided. The operation of the conveyors 54 and 64 is similar to the operation of the conveyor 10 described above. They are spaced apart closely enough, however, that the gap between the conveyors is kept to a minimum, allowing articles supported on the conveyor 54 to be moved onto the conveyor 64. This effectively extends the length of the conveyor system beyond the optimum length of a single conveyor. Thus a conveyor system can be provided consisting of a number of lengths of conveyors.

It will now be appreciated that the invention provides a conveyor system which does not effectively diminish the space available for free movement of workmen and other traffic, and which in much less expensive than prior conveyor systems for transporting articles within a manufacturing facility.

It should now be understood that the invention is not necessarily limited to all the specific details of the preferred embodiments but that changes to certain features of the preferred embodiments which do not effect the overall basic function and concept of the invention may be made by those skilled in the art without departing from the spirit and scope of the invention, as defined in the appended claims.

What is claimed is:

1. Apparatus for transporting articles over a floor, comprising:
   an endless conveyor having an upper delivery run and a lower return run;
   means for driving the conveyor;
   the lower return run of the conveyor being adjacent to and supported by floor support means; and
   the upper delivery run of the conveyor being slidingly supported by the lower return run.

2. Apparatus according to claim 1, wherein the conveyor comprises an endless belt.

3. Apparatus according to claim 2, wherein the coefficient of friction of the belt material is such that the lower and upper runs of the belt slide readily over each other.

4. Apparatus according to claim 3, wherein the coefficient of friction of the belt and the coefficient of friction of the floor support means are such that the lower run of the belt slides readily over the floor support means.

5. Apparatus according to claim 4, wherein the floor support means comprises a slider pad between the lower run of the conveyor and the floor.

6. Apparatus according to claim 5, wherein the slider pad comprises sheet metal.

7. Apparatus according to claim 4, wherein the floor support means comprises the surface of the floor.

8. Apparatus according to claim 1, wherein the drive means includes a drive roll and a tail roll, the drive and tail rolls being located substantially beneath the level of the floor support means.

9. Apparatus according to claim 8, wherein the upper surface of the upper delivery run of the conveyor is at substantially the same height above the floor support means at the drive roll and the tail roll as it is between the drive and tail rolls.

10. Apparatus according to claim 1, wherein the drive means includes a drive roll and a tail roll, the drive and tail rolls being located substantially above the level of the floor.

11. Apparatus according to claim 1, wherein the upper surface of the upper delivery run is spaced from the floor support means a distance not exceeding about ½ inch.

12. Apparatus according to claim 1, including a plurality of endless conveyors arranged in series so that the head end of a downstream conveyor is closely spaced from the tail end of the adjacent upstream conveyor, whereby articles can be transferred from one conveyor to an adjacent downstream conveyor.

13. Apparatus according to claim 1, wherein the conveyor is relatively long and the drive means moves the conveyor at a speed of less than 250 feet per minute.

14. A method of transporting articles over a floor, comprising the steps of:
   providing a relatively long endless conveyor having an upper delivery run and a lower return run;
   locating the lower return run of the conveyor so that it is adjacent to and supported by floor support means;
   locating the upper delivery run of the conveyor so that it is adjacent to and supported by the lower return run; and
   moving the conveyor at a relatively slow speed, the upper delivery run sliding on the lower return run and the lower return run sliding on the floor support means.

15. A method according to claim 15, wherein the floor support means comprises a slider pad between the lower run of the conveyor and the floor.

16. A method according to claim 14, wherein the floor support means comprises the floor of a building.

17. A method according to claim 14, wherein the upper surface of the upper delivery run is spaced from the floor a distance not exceeding about ½ inch.

18. A method according to claim 14, wherein the conveyor moves at a speed of less than 250 feet per minute.

* * * * *

UNITED STATES PATENT AND TRADEMARK OFFICE
CERTIFICATE OF CORRECTION

PATENT NO. : 4,848,539
DATED : July 18, 1989
INVENTOR(S) : Robert John Allwein

It is certified that error appears in the above—identified patent and that said Letters Patent is hereby corrected as shown below:

Col. 6, line 56:

Dependent claim 15 is made dependent upon independent claim 14.

Signed and Sealed this

Fifteenth Day of May, 1990

Attest:

HARRY F. MANBECK, JR.

*Attesting Officer*  *Commissioner of Patents and Trademarks*